United States Patent [19]
Lee

[11] Patent Number: 5,828,418
[45] Date of Patent: Oct. 27, 1998

[54] VIDEO DISPLAY CONTROLLING DEVICE FOR MAKING IMAGE DATA TRANSFORMATIONS PRIOR TO DISPLAY, INCLUDING EXPANSION COMPRESSION, AND MOVING OF ONE OR MORE ASPECTS OF THE IMAGE

[75] Inventor: Yong-hyun Lee, Seoul, Rep. of Korea

[73] Assignee: Samsung Electronics Co., Ltd., Kyungki-Do, Rep. of Korea

[21] Appl. No.: 719,703

[22] Filed: Sep. 27, 1996

[30]     Foreign Application Priority Data

Sep. 27, 1995  [KR]  Rep. of Korea ................... 1995-32198
Sep. 27, 1995  [KR]  Rep. of Korea ................... 1995-32199
Sep. 27, 1995  [KR]  Rep. of Korea ................... 1995-32200
Oct. 17, 1995  [KR]  Rep. of Korea ................... 1995-35858

[51] Int. Cl.$^6$ ....................................................... H04N 5/46
[52] U.S. Cl. .......................... 348/556; 348/558; 348/581
[58] Field of Search ................................... 348/556, 558, 348/554, 555, 561, 581, 704; H04N 5/46

*Primary Examiner*—Sherrie Hsia
*Attorney, Agent, or Firm*—Sughrue, Mion, Zinn, Macpeak & Seas, PLLC

[57]     ABSTRACT

Image transformation is performed via a video display controlling device. Image data is transformed from an image storage memory having a matrix size of (N+a)×(M+b) onto a display screen sized to display an image according to N×M size matrix. The video display controlling device operates according to any one (or a combination of) several image transformation modes, including a normal mode, an expansion mode, a compression mode, and a moving image mode. These transformations are accomplished by first setting vertical and horizontal addresses of a reference pixel among pixel data stored in the storage memory, and setting an image mode for transforming an original image in a predetermine pattern. Addresses are then generated, in accordance with the set reference pixel and the set image mode, for selecting an N×M set of pixel data from among the (N+a)×(M+b) pixel data in the storage memory.

17 Claims, 12 Drawing Sheets

![FIG 6A diagram showing grid with M columns labeled 0,1,2,3,4,5...M-1 and rows labeled 0,2,4,6,8... with diagonal dots]

| 20 | 20 | 21 | 21 | 22 | 22 | · · · |

VIDEO DISPLAY CONTROLLING DEVICE FOR MAKING IMAGE DATA TRANSFORMATIONS PRIOR TO DISPLAY, INCLUDING EXPANSION COMPRESSION, AND MOVING OF ONE OR MORE ASPECTS OF THE IMAGE

BACKGROUND OF THE INVENTION

The present invention relates to a device for displaying a video signal, and more particularly, to a video display controlling device which enables an arbitrarily transformed image to be displayed on a monitor based upon a user's command.

This application regarding a video display controlling device is based upon Korean Patent Application No. 95-32198, filed Sep. 27, 1995, which is incorporated by reference herein for all purposes.

When a video signal is input to a video displaying device it is displayed on a monitor. In such a situation, a function of transforming the image upon a user's command and then displaying the transformed image is desirable.

SUMMARY OF THE INVENTION

Accordingly, it is an object of the present invention to provide a video display controlling device which can perform an image transformation, such as image compression or expansion, by manipulating a video signal to be displayed on a screen.

To accomplish the above object, there is provided a video display controlling device comprising a display means, a storing means, a reference pixel setting means, an image mode setting means, and an address generating means. The display means displays an image constituted by (N×M) pixel data on a screen. The storing means stores [(N+a)×(M+b)] pixel data associated with an image, where addresses for reading the pixel data are composed of vertical addresses from 0 to (N+a−1) and horizontal addresses from 0 to (M+b−1), and the reference letters a and b are positive integers. The reference pixel setting means sets vertical and horizontal addresses of a reference pixel data among pixel data stored in the storing means. The image mode setting means sets an image mode for transforming an original image according to a predetermined pattern and displaying the transformed image on the screen of the displaying means. The address generating means generates addresses for selecting a predetermined pixel data among the [(N+a)×(M+b)] pixel data, in accordance with the reference pixel data and the image mode. The pixel data read from the storing means at the vertical and horizontal addresses, which are generated by the address generating means, is displayed on the screen of the displaying means.

BRIEF DESCRIPTION OF THE DRAWINGS

The above object and advantage of the present invention will become more apparent as a preferred embodiment of thereof is described in detail with reference to the attached drawings in which.

DETAILED DESCRIPTION OF THE INVENTION

Figure 1:
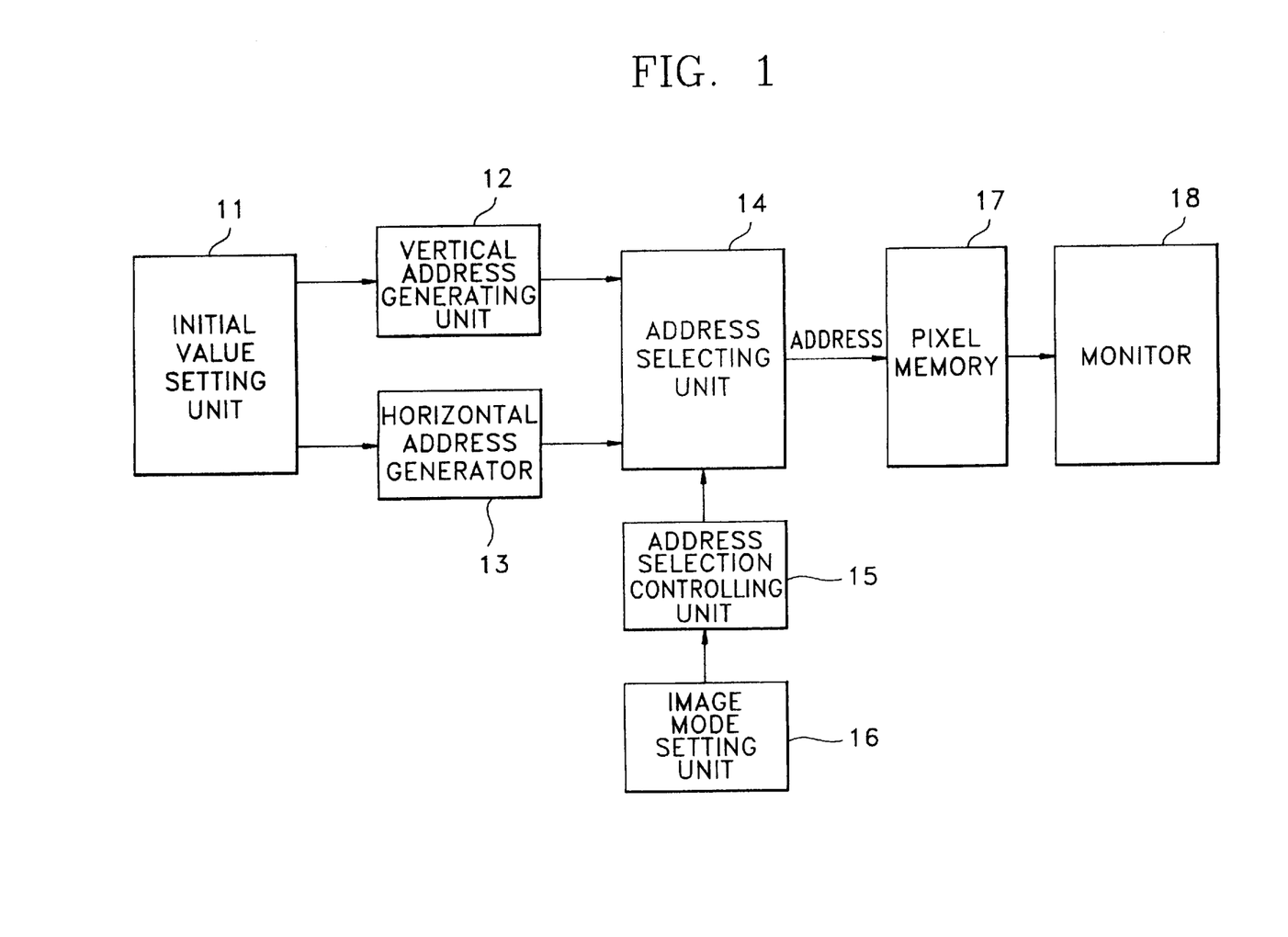
FIG. 1 is a block diagram of a video display controlling device according to the present invention.

Referring to FIG. 1, the video display controlling device according to the present invention includes a monitor 18 which is a display device capable of displaying a video image composed of (N×M) pixel data. Pixel memory 17 stores [(N+a)×(M+b)] pixel data associated with an image, wherein an address for reading the pixel data is comprised of vertical addresses from 0 to (N+a−1) and horizontal addresses from 0 to (M+b−1) (here, the reference letters a and b are positive integers). The initial value setting unit 11 sets vertical and horizontal addresses of reference pixel data among pixel data stored in the pixel memory 17. An image mode setting unit 16 sets an image mode, such as a mode for compressing or expanding an original image and then displaying it. Vertical address generating unit 12 sequentially generates vertical addresses, for accessing the pixel memory 17, starting from the vertical address set by the initial value setting unit 11. Likewise, horizontal address generating unit 13 sequentially generates horizontal addresses, for accessing the pixel memory 17, starting from the horizontal address set by the initial value setting unit 11. An address selection controlling unit 15 generates a control signal for controlling the selection of a predetermined pixel data among the [(N+a)×(M+b)] pixel data in the pixel memory 17, depending on the address of the reference pixel data and the image mode. The address selecting unit 14 selects the vertical addresses generated by the vertical address generating unit 12 and the horizontal addresses generated by the horizontal address generating unit 13 (depending on the control signal form the address selection controlling unit 15) in sequence or in a predetermined interval unit, and then generates addresses for accessing the pixel memory 17.

The present invention is capable of operation according to the following image modes. In a normal mode, an original image is displayed without transformation. In a vertical compression mode the original image is compressed in a vertical direction before displaying it. In contrast, the horizontal compression mode compresses the original image in a horizontal direction before displaying it. The full compression mode compresses the original image in horizontal and vertical directions and displaying it, whereas the expansion mode expands a portion of the original image and displaying it. A moving mode is provided for displaying the original image with respect to an image stored in the pixel memory 17 as a plurality of images on the screen of the monitor 18.

Figure 2:
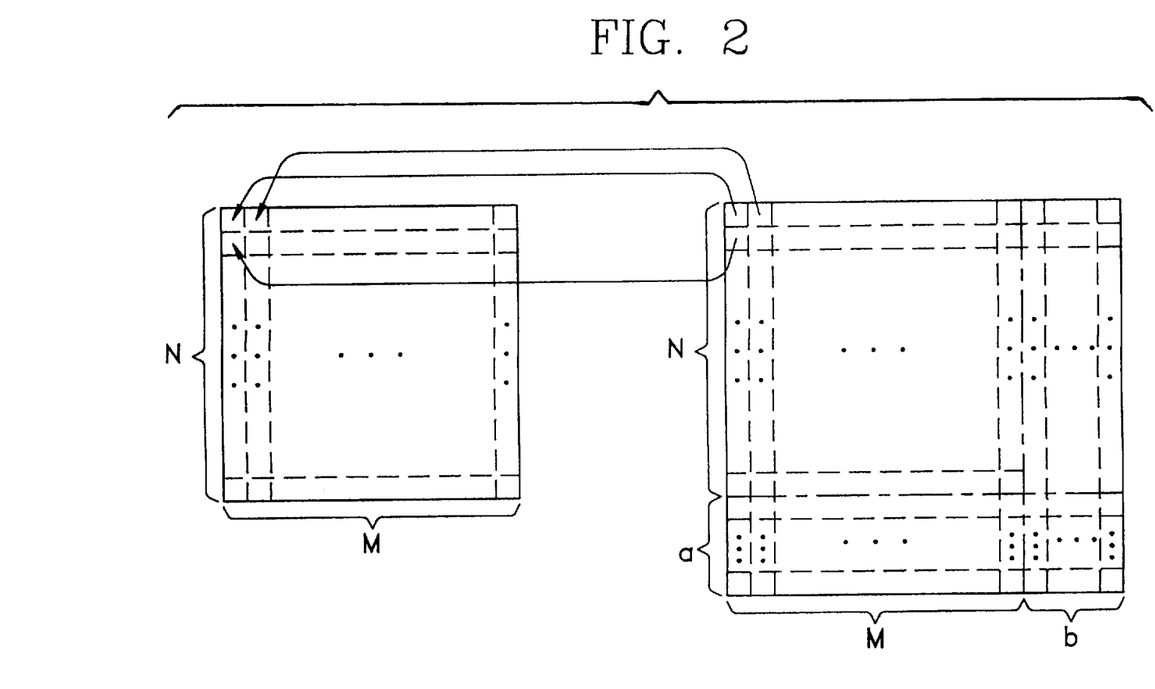
FIG. 2 shows an (N×M) pixel of a monitor and a [(N+a)×(M+b)] pixel stored in a memory, respectively.

FIG. 2 shows an (N×M) pixel matrix to be shown on the monitor 18, and a [(N+a)×(M+b)] pixel matrix stored in the pixel memory 17. Here, the variable "N" represents the amount of pixels capable of being vertically displayed on the monitor 18, and thus the term (N+a) represents an amount of pixels which exceeds the capacity of the monitor 18. Likewise, the term (M+b) represents an amount of pixels which exceeds the amount "M" capable of being horizontally displayed on the monitor 18. The drawings show a display of pixel data having addresses from (0, 0) to (N−1, M−1) in the pixel memory 17.

Figure 3:
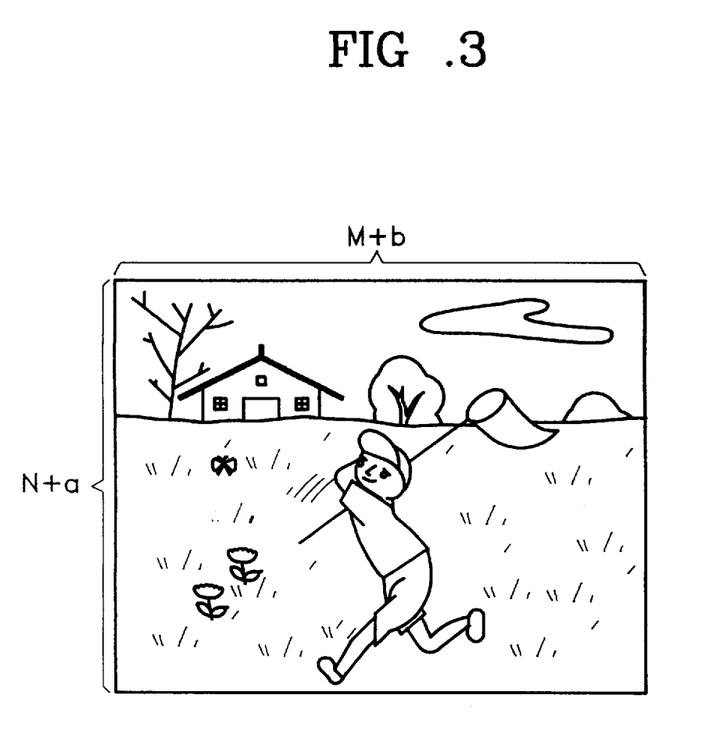
FIG. 3 shows an image which can be displayed using the [(N+a)×(M+b)] pixel stored in the pixel memory.

FIG. 3 shows a full image representing image data which can be displayed by using the [(N+a)×(M+b)] pixel data stored in the pixel memory 17. The pixel memory 17 stores more pixel data than will fit on the screen of the monitor 18.

Hereinbelow, address settings according to settings of an image mode and a reference pixel data, and an image to be displayed according to the address settings will be described referring to the drawings.

Figure 4A:
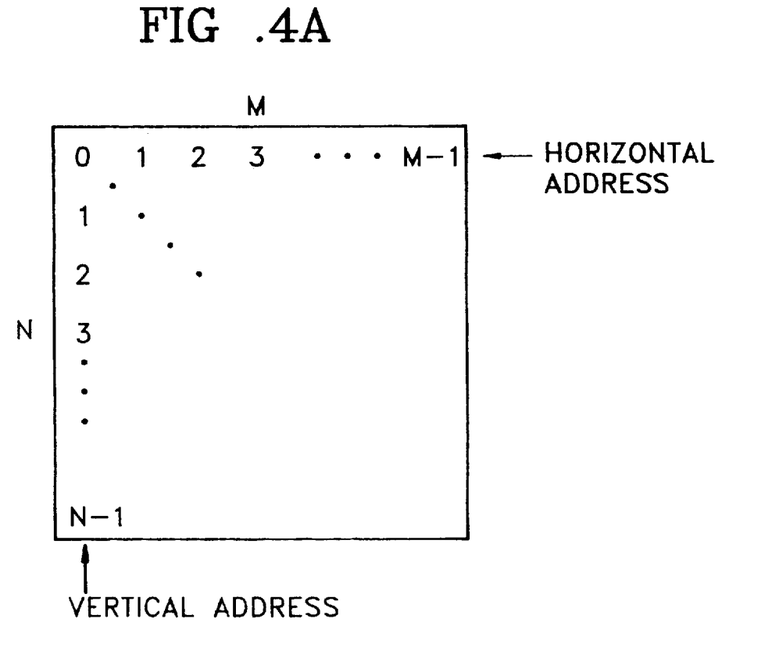
FIGS. 4A & 5A each show address settings in accordance with a normal image display mode.
Figure 4B:
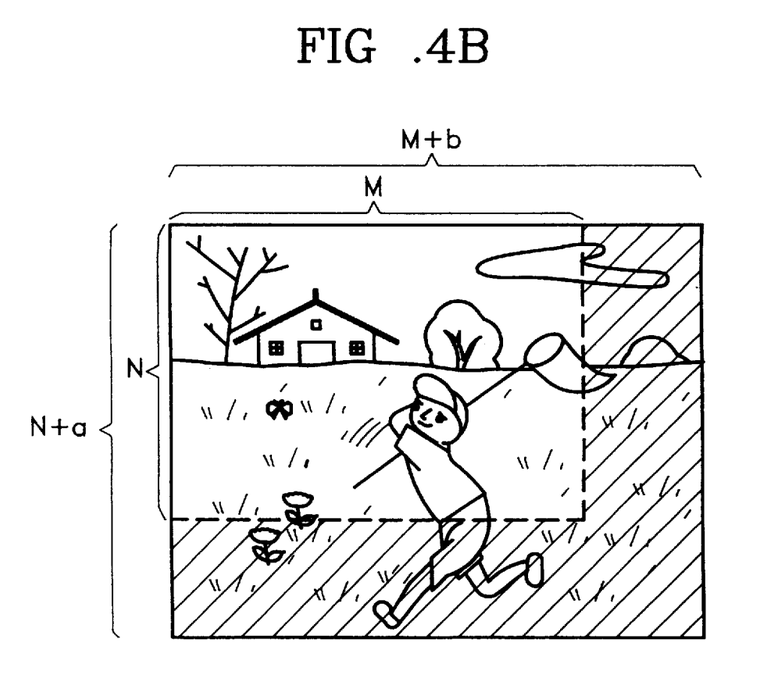
FIGS. 4B & 5B each show an image to be displayed in accordance with the normal mode address settings shown in FIGS. 4A & 5A, respectively.

FIG. 4A shows an address setting for sequentially selecting the (N×M) pixel from the pixel memory 17 starting from address (0, 0). FIG. 4B shows the image displayed on the monitor 18 according to the address set shown in FIG. 4A. In this case, the image mode setting unit 16 sets the image mode as a normal mode. Accordingly, the initial value setting unit 11 sets the vertical and horizontal addresses of the reference pixel data to "0". The address selecting unit 14 sequentially generates vertical addresses from "0" to (N−1) and horizontal addresses from "0" to (M−1). That is, the pixel data of the pixel memory 17, having addresses from (0, 0) to (N−1, M−1), is selected and displayed on the screen of the monitor 18. In FIG. 4B, the shaded portion denotes pixel data stored in the pixel memory 17 which is not displayed on the monitor 18. Hereinbelow, this explanation is applied in a similar manner to the following drawings.

Figure 5A:
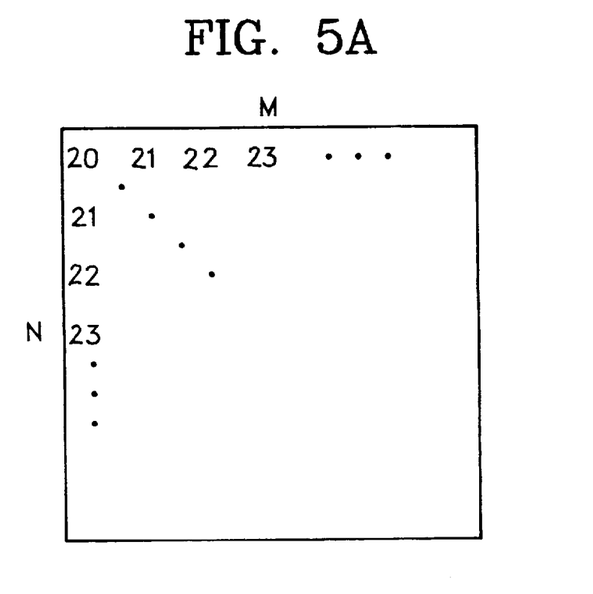
Figure 5B:
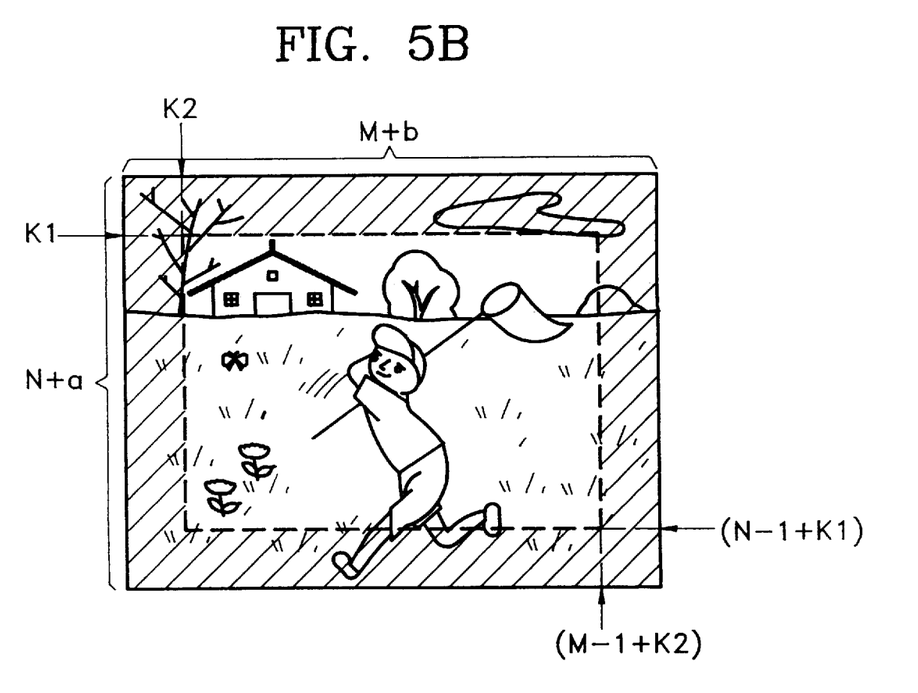

FIG. 5A shows an address setting for sequentially selecting the (N×M) pixel data from the pixel memory 17, starting from an arbitrary position, and FIG. 5B shows an image displayed on the monitor 18 according to the address set shown in FIG. 5A. In this case, the image mode is set as a normal mode as in FIGS. 4A and 4B, but the vertical and horizontal addresses of the reference pixel data are set as K1 and K2 (here, K1 and K2 are integers larger than zero), respectively. Here, the address selecting unit 14 sequentially generates vertical addresses from K1 to (N−1+K1) and horizontal addresses from K2 to (M−1+K2). That is, the pixel data, having addresses from (K1, K2) to (N−1+K1, M−1+K2) in the pixel memory 17, are selected and displayed on the screen of the monitor 18.

Figure 6A:
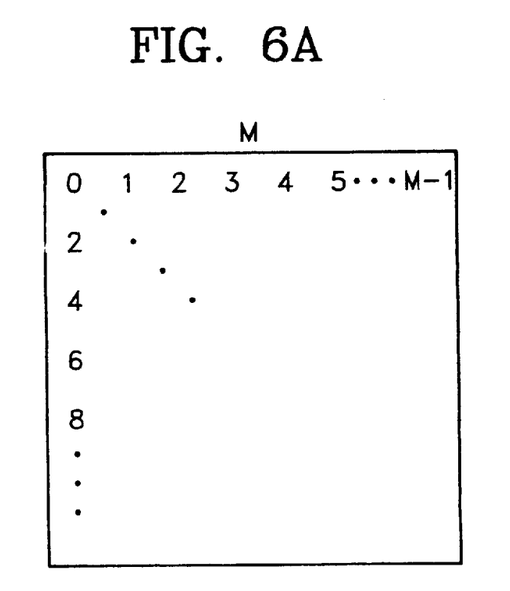
FIGS. 6A and 6B show, respectively, an address setting and an image to be displayed according to the address setting, according to a vertical compression mode.
Figure 6B:
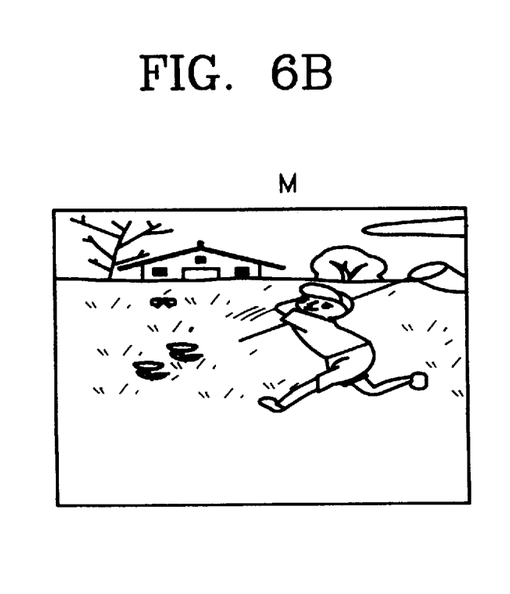

FIG. 6A shows an address setting for producing a vertically compressed image, and FIG. 6B shows the image displayed on the monitor 18 according to the address set shown in FIG. 6A. Here, the image mode setting unit 16 sets the image as a vertical compression mode, and the initial value setting unit 11 sets both the vertical and horizontal addresses of the reference pixel data to "0". The address selecting unit 14 sequentially generates horizontal addresses from "0" to (M−1) and vertical addresses starting from "0" and increasing by predetermined constant intervals. Here, the interval is set as 2. That is, when the pixel data of the pixel memory 17 is selected as described above, an original image is vertically compressed and displayed on the upper portion of the screen of the monitor 18.

Figure 7A:
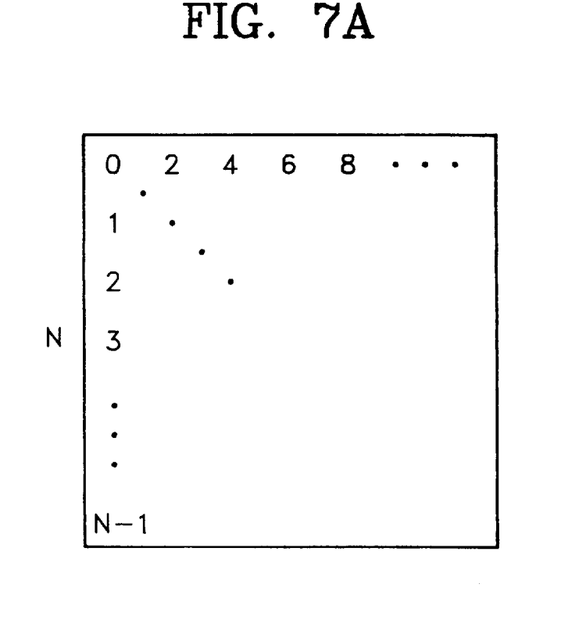
FIGS. 7A and 7B show, respectively, an address setting and an image to be displayed according to the address setting, according to a horizontal compression mode.
Figure 7B:
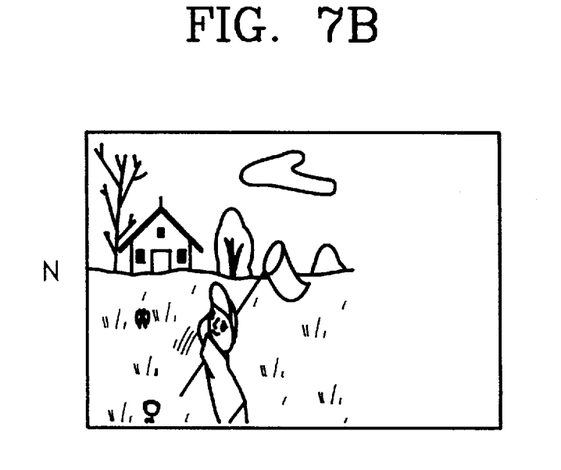

FIG. 7A shows an address setting for producing a horizontally compressed image, and FIG. 7B shows the image displayed on the monitor 18 in accordance with the address set shown in FIG. 7A. Here, the image mode setting unit 16 sets the image as a horizontal compression mode, and the initial value setting unit 11 sets both the vertical and horizontal addresses of the reference pixel data to "0". The address selecting unit 14 sequentially generates vertical addresses from "0" to (M−1) and vertical addresses starting from "0" and increasing by predetermined constant intervals. Here, the interval is set as 2. That is, when the pixel data of the pixel memory 17 is selected as described above, an original image is horizontally compressed and displayed on the left side of the screen of the monitor 18.

Figure 8A:
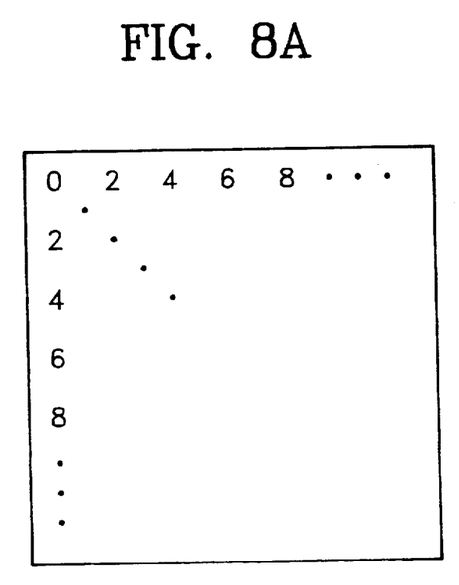
FIGS. 8A & 9A each show address settings according to a full compression mode.
Figure 8B:
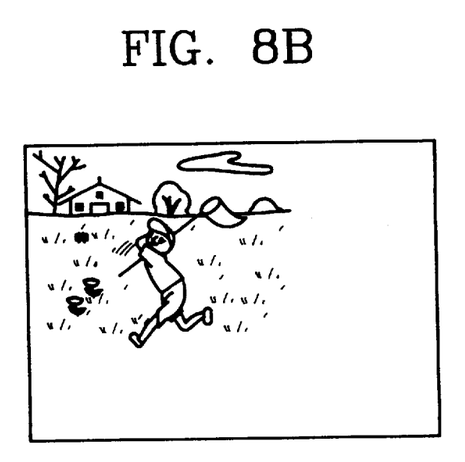
FIGS. 8B & 9B each show an image to be displayed in accordance with the full compression mode address settings of FIGS. 8A & 9A, respectively.

FIG. 8A shows an address setting for producing a fully compressed image, and FIG. 8B shows the image displayed on the monitor 18 according to the address set shown in FIG. 8A. In this case, the image mode setting unit 16 sets the image mode as a full compression mode. The initial value setting unit 11 sets both the vertical and horizontal addresses of the reference pixel data as "0" and the address selecting unit 14 generates vertical addresses starting from "0" and increasing by first predetermined constant intervals and horizontal addresses starting from "0" and increasing by second predetermined constant intervals. Here, the first and second constant intervals are both set as being 2. That is, when the pixel data of the pixel memory 17 is selected as described above, an original image is horizontally and vertically compressed and displayed on the upper-left-most portion of the screen of the monitor 18.

Figure 9A:
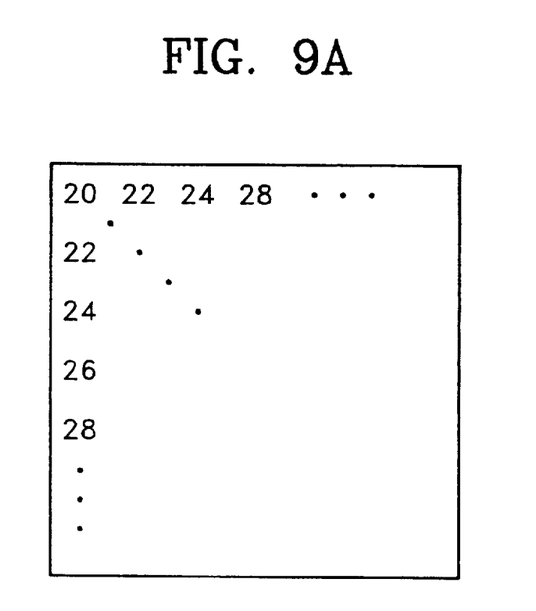
Figure 9B:
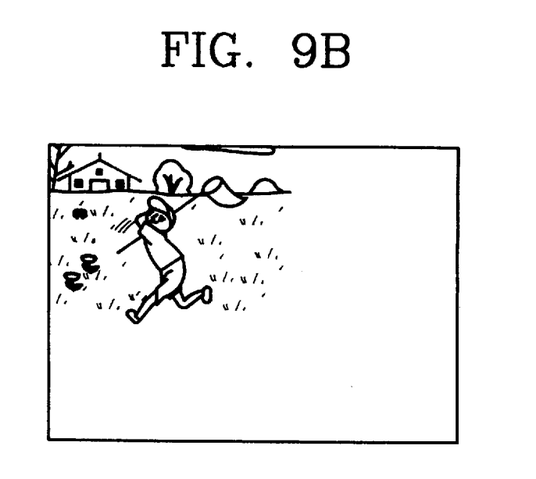

FIG. 9A shows an address setting for producing a fully compressed screen with respect to an arbitrarily selected portion of an image, and FIG. 9B shows the image displayed on the monitor 18 according to the address set shown in FIG. 9A. In this case, the image mode is set as a full compression mode as in FIGS. 8A and 8B. However, both the vertical and horizontal addresses of the reference pixel data are set as being 20.

Figure 10A:
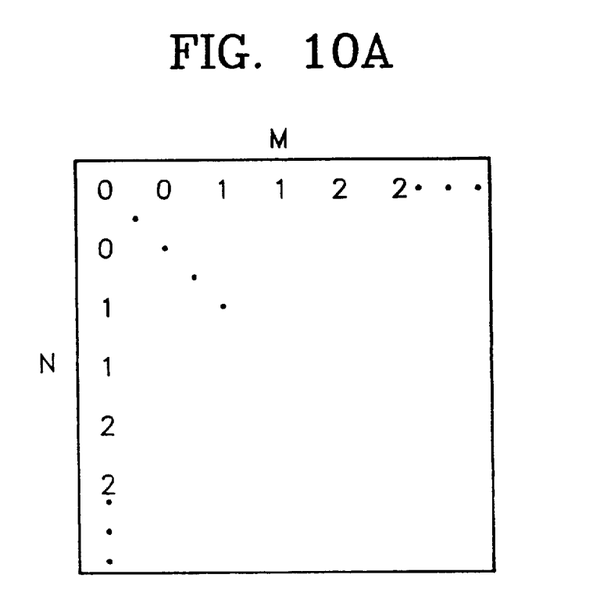
FIGS. 10A & 11A each show an address setting according to an expansion mode.
Figure 10B:
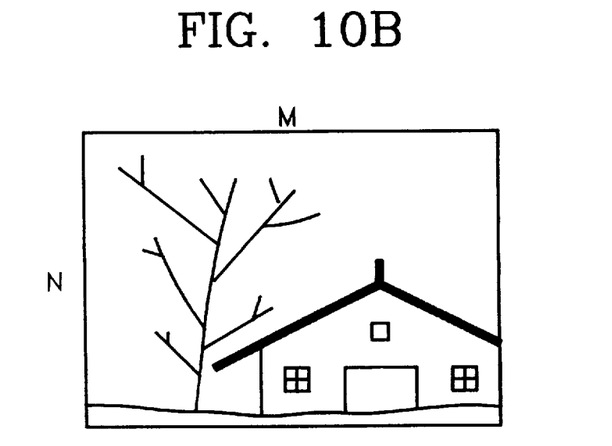
FIGS. 10B & 11B each show an image to be displayed in accordance with the expansion mode address settings of FIGS. 10A & 11A, respectively.

FIG. 10A shows an address setting for producing an expanded image, and FIG. 10B shows the image displayed on the monitor 18 according to the address set shown in FIG. 10A. In this case, the image mode setting unit 16 sets the image mode as an expansion mode. The initial value setting unit 11 sets both the vertical and horizontal addresses of the reference pixel data as "0", and the address selecting unit 14 sequentially selects both vertical and horizontal addresses starting from "0" and repeatedly generates the selected vertical addresses by a predetermined first repetition number and the selected horizontal addresses by a predetermined second repetition number. Here, the first and second repetition numbers (or repeating intervals) are both set as being 2, respectively. That is, when the pixel data of the pixel memory 17 is selected as described above, a partial original image is horizontally and vertically expanded and displayed on the screen of the monitor 18.

Figure 11A:
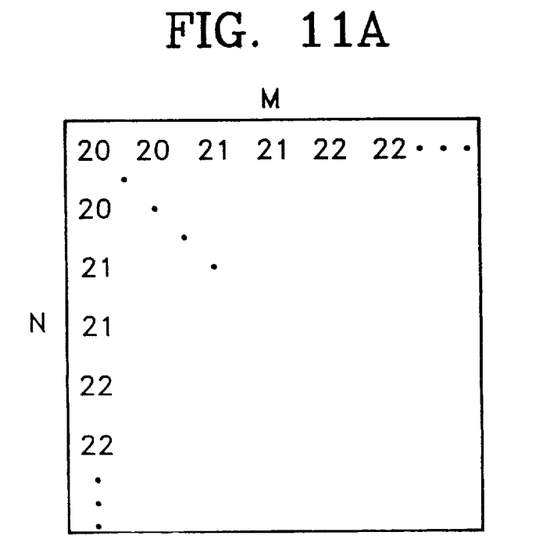
Figure 11B:
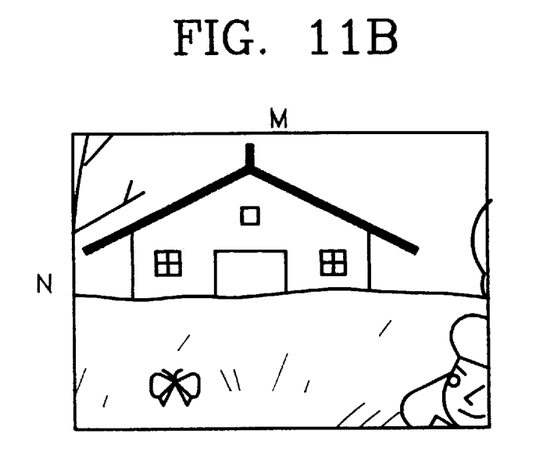

FIG. 11A shows an address setting for producing an expanded image of an arbitrarily selected image portion, and FIG. 11B shows the image displayed on the monitor 18 in accordance with the address set shown in FIG. 11A. In this case, the image mode is set as an expansion mode as in FIGS. 10A and 10B. However, both the vertical and horizontal addresses of the reference pixel data are set as being 20.

Figure 12:
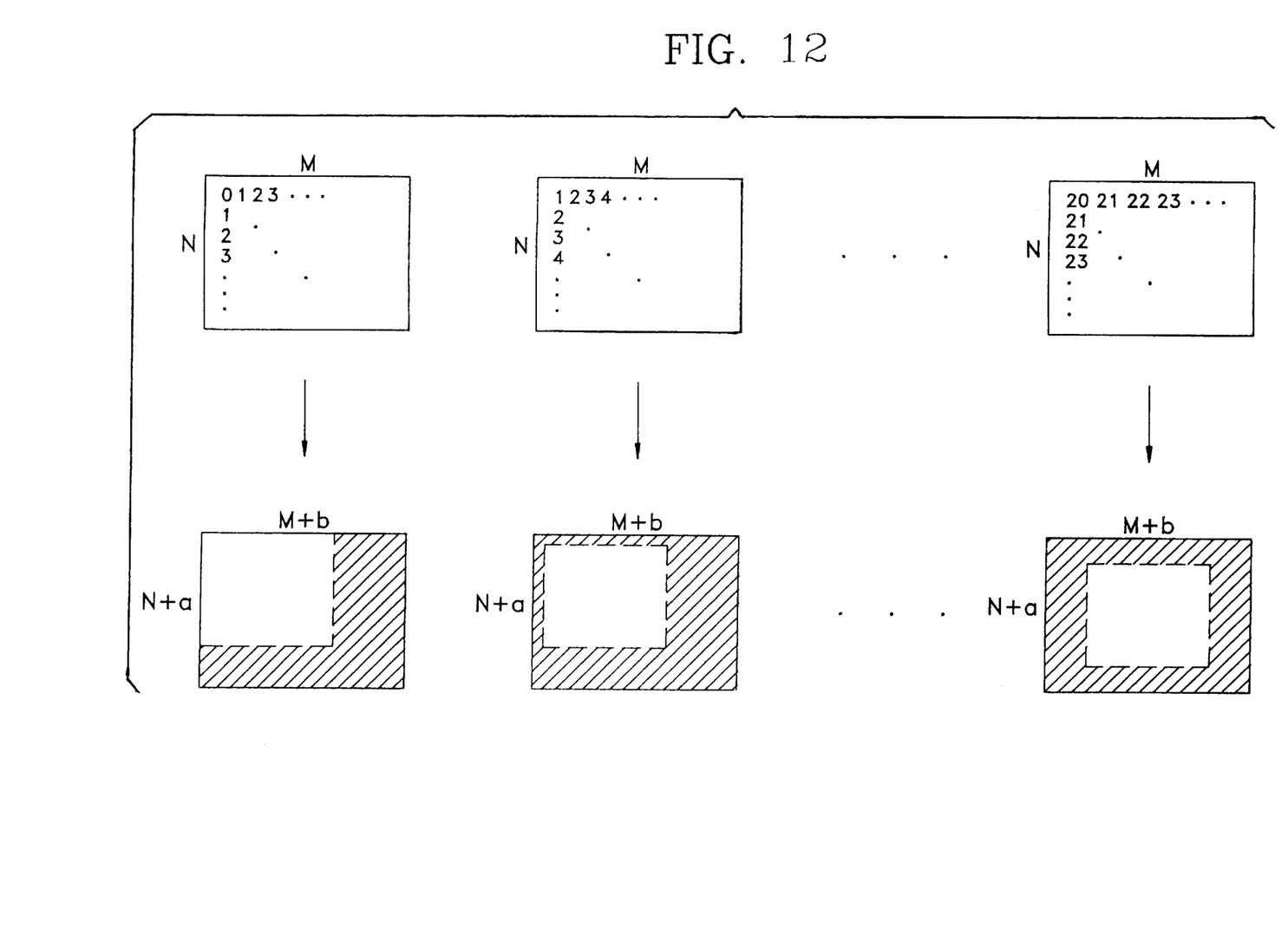
FIG. 12 shows a progression of address settings according to a "moving" mode.

FIG. 12 shows an address setting for producing a moving image, wherein the upper row of illustration blocks each show an address setting for producing an image composed of (N×M) pixel data, and the lower row of illustration blocks each show which pixel data from the pixel memory 17 is accessed according to the address set shown directly above it. In this case, the image mode setting unit 16 sets the image mode as a moving mode. In the moving mode, pixel data corresponding to an original image stored in the pixel memory 17 is sequentially accessed and displayed so that the image on the screen of the monitor 18 moves by a predetermined interval of displacement upon incrementing the addresses.

According to the example of FIG. 12, the initial value setting unit 11 sets both the vertical and horizontal addresses of the reference pixel data to "0", and the address selecting unit 14 sequentially generates vertical addresses from "0" to (N−1) and horizontal addresses from "0" to (M−1) (shown in the left-most upper block of FIG. 12). That is, pixel data having addresses from (0, 0) to (N−1, M−1) in the pixel memory 17 (as shown in the left-most lower block of FIG. 12), is selected and displayed on the screen of the monitor 18. Next, the initial value setting unit 11 increases the vertical and horizontal addresses of the reference pixel data by one and the address selecting unit 14 sequentially generates an address capable of selecting (N×M) pixel data from the increased reference address. That is, pixel data of the pixel memory 17, accessed by the following addresses, are sequentially displayed on the screen of the monitor 18. The following is an example of the sequential address matrices according to the incrementing method.

(0, 0)×(N−1, M−1); (1, 1)×(N, M); (2, 2)×(N+1, M+1); . . . ; (20, 20)×(N+19, M+19); . . .

The progression of block from left to right in FIG. 12 illustrates this concept.

As described above, the video display controlling device of the present invention stores more pixel data than that capable of being displayed by a monitor and generates an address for accessing the pixel data of the memory, depending on the image modes, thus easily realizing functions such as image compression or extension in a video display device.

Although the present invention has been described with respect to a preferred embodiment, it will be appreciated that various modifications and changes may be made to the described embodiment without departing from the spirit and scope of the invention.

What is claimed is:

1. A video display controlling device comprising:

display means for displaying an image constituted by an N×M matrix of pixel data on a screen;

storing means for storing an (N+a)×(M+b) matrix of pixel data associated with an image, where addresses for reading the pixel data are composed of vertical addresses from 0 to (N+a−1) and horizontal addresses from 0 to (M+b−1), and the reference letters a and b are positive integers;

reference pixel setting means for setting vertical and horizontal addresses of a reference pixel among pixel data stored in said storing means;

image mode setting means for setting an image mode for transforming an original image according to a predetermined pattern and displaying the transformed image on the screen of said displaying means; and address generating means for generating addresses for selecting a predetermined set of pixel data among the (N+a)×(M+b) pixel data in said storing means, in accordance with the reference pixel and the image mode;

wherein the pixel data selected from said storing means at the vertical and horizontal addresses generated by said address generating means is displayed on the screen of said displaying means.

2. The video display controlling device as claimed in claim 1, wherein the image mode set in the image mode setting means is selected from the group consisting of: a normal mode for displaying the original image on the screen without transformation, a vertical compression mode for compressing the original image in a vertical direction and for displaying the original image compressed in the vertical direction, a horizontal compression mode for compressing the original image in a horizontal direction and for displaying the original image compressed in the horizontal direction, a full compression mode for compressing the original image in the vertical and horizontal directions and for displaying the original image compressed in the vertical and horizontal directions, an expansion mode for expanding a portion of the original image and for displaying the expanded original image, and a moving mode for displaying the original image, stored in said storing means, as a plurality of successive images on the screen of said displaying means.

3. The video display controlling device as claimed in claim 2, wherein said reference pixel setting means sets the vertical and horizontal addresses of the reference pixel as K1 and K2 which are integers larger than or equal to 0, respectively; and wherein, when said image mode setting means sets the normal mode for displaying the original image on the screen without transformation, said address generating means sequentially generates vertical addresses from K1 to (N−1+K1) and horizontal addresses from K2 to (M−1+K2).

4. The video display controlling device as claimed in claim 2, wherein said reference pixel setting means sets the vertical and horizontal addresses of the reference pixel as K1 and K2 which are integers larger than or equal to 0, respectively; and wherein, when said image mode setting means sets the vertical compression mode for vertically compressing the original image and displaying the vertically compressed image on the screen, said address generating means sequentially generates vertical addresses starting from K1 and increasing by predetermined constant pixel intervals and horizontal addresses from K2 to (M−1+K2).

5. The video display controlling device as claimed in claim 2, wherein said reference pixel setting means sets the vertical and horizontal addresses of the reference pixel as K1 and K2 which are integers larger than or equal to 0, respectively; and wherein, when said image mode setting means sets the horizontal compression mode for horizontally compressing the original image and displaying the horizontally compressed image on the screen, said address generating means sequentially generates vertical addresses of from K1 to (N−1+K1) and horizontal addresses starting from K2 and increasing by predetermined constant pixel intervals.

6. The video display controlling device as claimed in claim 2, wherein said reference pixel setting means sets the vertical and horizontal addresses of the reference pixel as K1 and K2 which are integers larger than or equal to 0, respectively; and wherein, when said image mode setting means sets the full compression mode for fully compressing the original image and displaying the fully compressed image on the screen, said address generating means generates vertical addresses starting from K1 and increasing by predetermined constant first intervals and horizontal addresses starting from K2 and increasing by predetermined constant second intervals.

7. The video display controlling device as claimed in claim 2, wherein said reference pixel setting means sets the vertical and horizontal addresses of the reference pixel as K1 and K2 which are integers larger than or equal to 0, respectively; and wherein, when said image mode setting means sets the expansion mode for expanding a portion of original image and displaying the expanded image on the screen, said address generating means sequentially selects vertical addresses starting from K1 and repeatedly generates the selected vertical addresses by a predetermined first repetition number, and sequentially selects horizontal addresses starting from K2 and repeatedly generates the selected horizontal addresses by a predetermined second number.

8. The video display controlling device as claimed in claim 2, wherein, when said image mode setting means sets the moving mode for displaying the original image, corresponding to the image stored in said storing means, as a plurality of images on the screen of said display means;

said reference pixel setting means sets the vertical and horizontal addresses of the reference pixel as (0,), respectively; and said address generating means sequentially generates vertical addresses from "0" to (N−1) and horizontal addresses from "0" to (M−1);

subsequently, said reference pixel setting means increases the vertical and horizontal addresses of the reference pixel by one; and said address generating means sequentially generates addresses capable of selecting (N×M) pixel data starting from the increased reference pixel addresses.

9. A video display controlling device comprising:

display having a screen sized to display an image constituted by an N×M matrix of pixel data;

storage memory sized to store an (N+a)×(M+b) matrix of pixel data associated with an image, where addresses for reading the pixel data are composed of vertical addresses from 0 to (N+a−1) and horizontal addresses from 0 to (M+b−1), and the reference letters a and b are positive integers;

reference pixel setting unit for setting vertical and horizontal addresses of a reference pixel among pixel data stored in said storage memory;

image mode setting unit for setting an image mode for transforming an original image according to a predetermined pattern and displaying the transformed image on the screen of said display; and address generator for generating addresses for selecting a predetermined set of pixel data among the (N+a)×(M+b) pixel data in said storage memory, in accordance with the set reference pixel and the set image mode;

wherein the pixel data selected from said storage memory at the vertical and horizontal addresses generated by said address generator is displayed on the screen of said display.

10. The video display controlling device as claimed in claim 9, wherein the image mode set in the image mode setting unit is selected from the group consisting of: a normal mode for displaying the original image on the screen without transformation, a vertical compression mode for compressing the original image in a vertical direction and for displaying the original image compressed in the vertical direction, a horizontal compression mode for compressing the original image in a horizontal direction and for displaying the original image compressed in the horizontal direction, a full compression mode for compressing the original image in the vertical and horizontal directions and for displaying the original image compressed in the vertical and horizontal directions, an expansion mode for displaying the original image, stored in said storing means, as a plurality of successive images on the screen of said displaying means.

11. The video display controlling device as claimed in claim 10, wherein said reference pixel setting unit sets the vertical and horizontal addresses of the reference pixel as K1 and K2 which are integers larger than or equal to 0, respectively; and wherein, when said image mode setting unit sets the normal mode for displaying the original image on the screen without transformation, said address generator sequentially generates vertical addresses from K1 to (N−1+K1) and horizontal addresses from K2 to (M−1+K2).

12. The video display controlling device as claimed in claim 10, wherein said reference pixel setting unit sets the vertical and horizontal addresses of the reference pixel as K1 and K2 which are integers larger than or equal to 0, respectively; and wherein, when said image mode setting unit sets the vertical compression mode for vertically compressing the original image and displaying the vertically compressed image on the screen, said address generator sequentially generates vertical addresses starting from K1 and increasing by predetermined constant pixel intervals and horizontal addresses from K2 to (M−1+K2).

13. The video display controlling device as claimed in claim 10, wherein said reference pixel setting unit sets the vertical and horizontal addresses of the reference pixel as K1 and K2 which are integers larger than or equal to 0, respectively; and wherein, when said image mode setting unit sets the horizontal compression mode for horizontally compressing the original image and displaying the horizontally compressed image on the screen, said address generator sequentially generates vertical addresses of from K1 to (N−1+K1) and horizontal addresses starting from K2 and increasing by predetermined constant pixel intervals.

14. The video display controlling device as claimed in claim 10, wherein said reference pixel setting unit sets the vertical and horizontal addresses of the reference pixel as K1 and K2 which are integers larger than or equal to 0, respectively; and wherein, when said image mode setting unit sets the full compression mode for fully compressing the original image and displaying the fully compressed image on the screen of the display, said address generator generates vertical addresses starting from K1 and increasing by predetermined constant first intervals and horizontal addresses starting from K2 and increasing by predetermined constant second intervals.

15. The video display controlling device as claimed in claim 10, wherein said reference pixel setting unit sets the vertical and horizontal addresses of the reference pixel as K1 and K2 which are integers larger than or equal to 0, respectively; and wherein, when said image mode setting unit sets the expansion mode for expanding a portion of the original image and displaying the expanded image on the screen of the display, said address generator sequentially selects vertical addresses starting from K1 and repeatedly generates the selected vertical addresses by a predetermined first repetition number, and sequentially selects horizontal addresses starting from K2 and repeatedly generates the selected horizontal addresses by a predetermined second repetition number.

16. The video display controlling device as claimed in claim 10, wherein, when said image mode setting unit sets the moving mode for displaying the original image, corresponding to the image stored in said storage memory, as a plurality of images on the screen of said display;

said reference pixel setting unit sets the vertical and horizontal addresses of the reference pixel as (0, 0), respectively; and said address generator sequentially generates vertical addresses from "0" to (N−1) and horizontal addresses from "0" to (M−1);

subsequently, said reference pixel setting unit increases the vertical and horizontal addresses of the reference pixel by one; and said address generator sequentially generates addresses capable of selecting (N×M) pixel data starting from the increased reference pixel addresses.

17. A method for controlling a video display comprising the steps of:

(a) storing in a storage memory an (N+a)×(M+b) matrix of pixel data associated with an image, where addresses for reading the pixel data are composed of vertical addresses from 0 to (N+a−1) and horizontal addresses from 0 to (M+b−1), and the reference letters a and b are positive integers;

(b) setting vertical and horizontal addresses of a reference pixel among pixel data stored in said storage memory;

(c) setting an image mode according to which an original image is to be transformed according to a predetermined transformation pattern;

(d) generating addresses for selecting a set of N×M pixel data from among the (N+a)×(M+b) pixel data in said storage memory, based upon the reference pixel which has been set and the image mode which has been set; and (e) displaying on a display screen an image constituted by the selected set of N×M pixel data as a transformed image.

* * * * *